(12) United States Patent
Matsumoto et al.

(10) Patent No.: US 8,764,269 B2
(45) Date of Patent: Jul. 1, 2014

(54) LIGHT GUIDE PLATE AND LIGHT SOURCE MODULE

(75) Inventors: Shingo Matsumoto, Hsin-Chu (TW);
Han-Wen Tsai, Hsin-Chu (TW);
Ming-Feng Kuo, Hsin-Chu (TW);
Chih-Chieh Yu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 168 days.

(21) Appl. No.: 13/437,946

(22) Filed: Apr. 3, 2012

(65) Prior Publication Data
US 2012/0275190 A1 Nov. 1, 2012

(30) Foreign Application Priority Data

Apr. 29, 2011 (TW) .............................. 100115159 A

(51) Int. Cl.
*F21V 7/04* (2006.01)
*F21V 8/00* (2006.01)
*G02B 6/43* (2006.01)

(52) U.S. Cl.
USPC ............................ 362/626; 362/613; 362/625

(58) Field of Classification Search
USPC .................. 362/608, 617–621, 623–626, 613
See application file for complete search history.

(56) References Cited

U.S. PATENT DOCUMENTS

| 6,454,452 | B1 | 9/2002 | Sasagawa et al. |
| 6,576,887 | B2 | 6/2003 | Whitney et al. |
| 6,612,722 | B2 | 9/2003 | Ryu et al. |
| 6,788,358 | B1 * | 9/2004 | Kim et al. ................. 349/62 |
| 6,834,973 | B2 | 12/2004 | Ohkawa |
| 6,967,698 | B2 | 11/2005 | Tanoue et al. |
| 7,153,017 | B2 | 12/2006 | Yamashita et al. |
| 8,068,197 | B2 * | 11/2011 | Mifune et al. ............. 349/67 |
| 8,277,105 | B2 * | 10/2012 | Kim et al. ................. 362/609 |
| 2004/0130882 | A1 | 7/2004 | Hara et al. |
| 2004/0246698 | A1 | 12/2004 | Shimizu et al. |
| 2007/0279727 | A1 | 12/2007 | Gandhi et al. |
| 2009/0016067 | A1 | 1/2009 | Chang |
| 2009/0279324 | A1 | 11/2009 | Chen et al. |

FOREIGN PATENT DOCUMENTS

| CN | 1504808 | 6/2004 |
| CN | 1573467 | 2/2005 |
| CN | 1900786 | 1/2007 |
| CN | 1908764 | 2/2007 |

(Continued)

OTHER PUBLICATIONS

"Search Report of Europe Counterpart Application", issued on Jul. 27, 2012, p. 1-p. 9.

(Continued)

*Primary Examiner* — Alan Cariaso
(74) *Attorney, Agent, or Firm* — Jianq Chyun IP Office

(57) ABSTRACT

A light guide plate (LGP) includes a first surface, a second surface, at least one light incident surface, and a plurality of micro-structure sets. The second surface is opposite to the first surface. The light incident surface connects the first surface to the second surface. The micro-structure sets are separately disposed on the second surface, and the micro-structure sets are not continuous in any direction parallel to the first surface. Each of the micro-structure sets includes at least one protrusive structure that protrudes from the second surface and at least one recessive structure that is recessed in the second surface. A light source module is also provided.

16 Claims, 15 Drawing Sheets

(56) References Cited

FOREIGN PATENT DOCUMENTS

| | | |
|---|---|---|
| CN | 101290428 | 10/2008 |
| CN | 101595409 | 12/2009 |
| CN | 101606020 | 12/2009 |
| CN | 101634726 | 1/2010 |
| JP | 2003114337 | 4/2003 |
| TW | 581891 | 4/2004 |
| TW | I222533 | 10/2004 |
| TW | 200530632 | 9/2005 |
| TW | 200615614 | 5/2006 |
| TW | I282021 | 6/2007 |
| TW | M321111 | 10/2007 |
| TW | I296352 | 5/2008 |
| TW | 200846731 | 12/2008 |
| TW | 200900765 | 1/2009 |
| TW | 200903062 | 1/2009 |

OTHER PUBLICATIONS

"First Office Action of China Counterpart Application" with English translation thereof, issued on Mar. 26, 2013, p. 1-p. 21.

"Office Action of China Counterpart Application", issued on Nov. 12, 2013, p. 1-p. 8.

"Office Action of Taiwan Counterpart Application", issued on Oct. 28, 2013, p. 1-p. 12.

\* cited by examiner

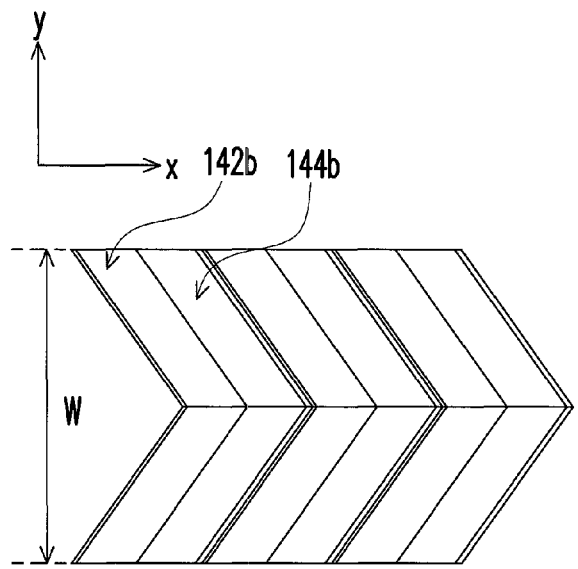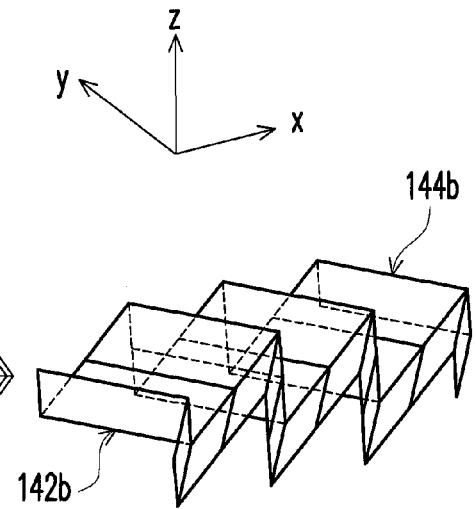
FIG. 8A    FIG. 8B
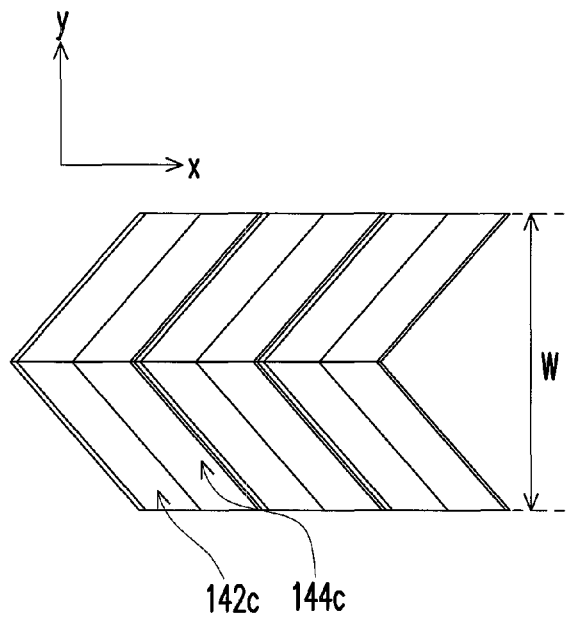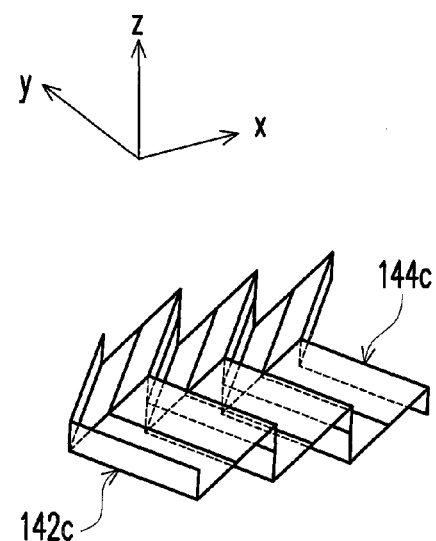
FIG. 9A    FIG. 9B

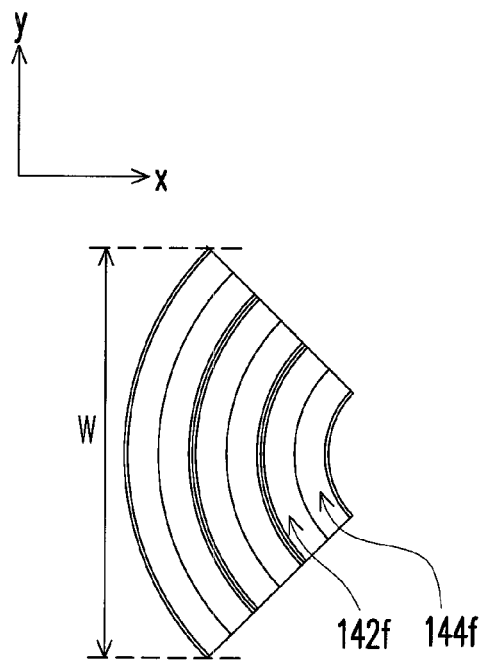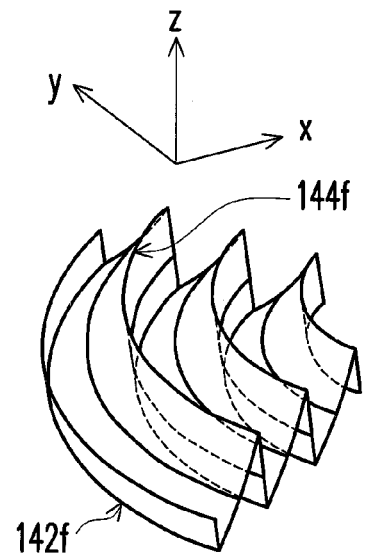
FIG. 12A    FIG. 12B
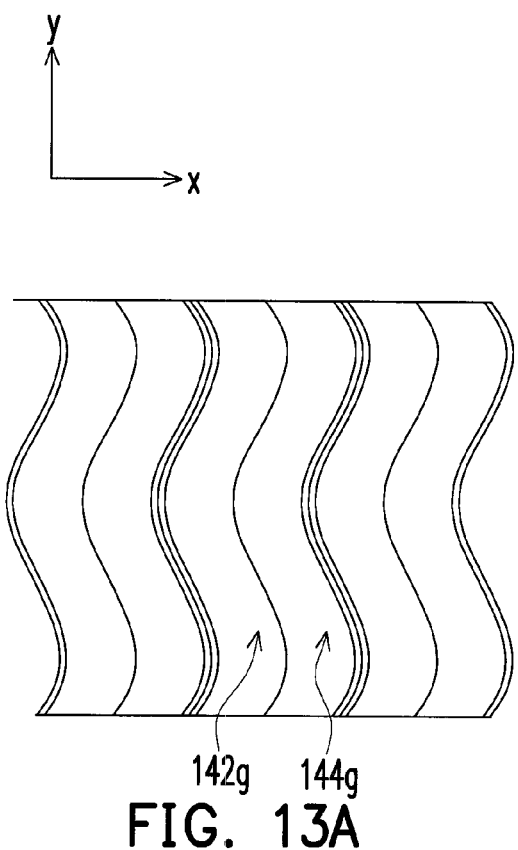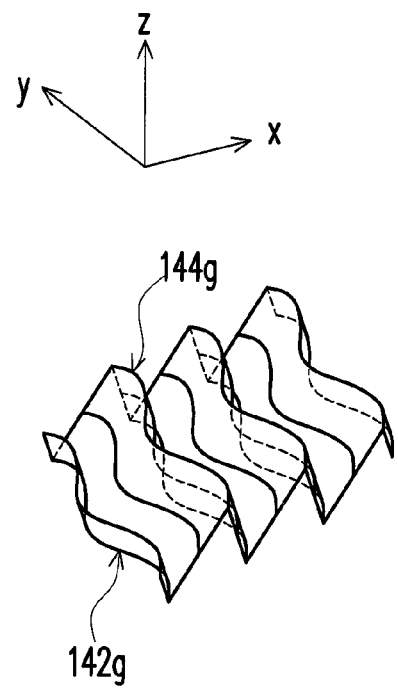
FIG. 13A    FIG. 13B

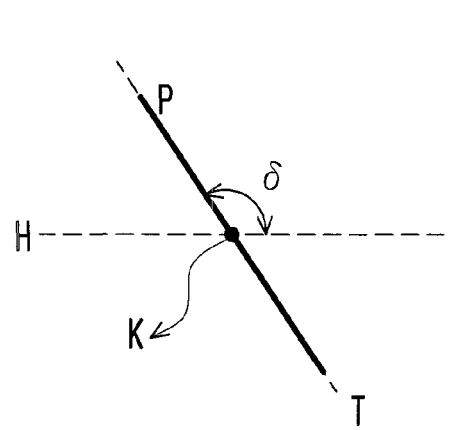 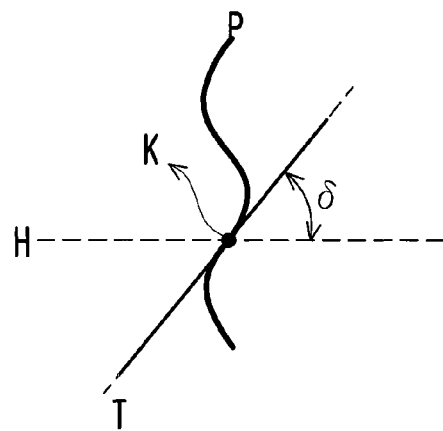
FIG. 16A			FIG. 16B
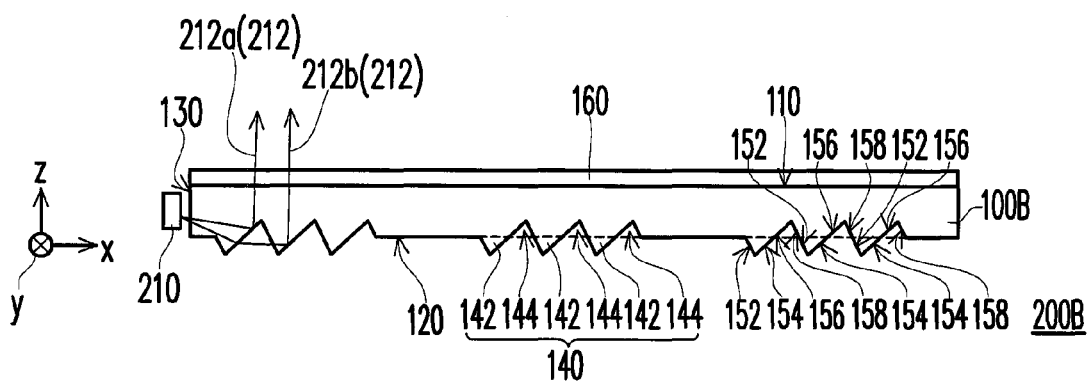
FIG. 17A

LIGHT GUIDE PLATE AND LIGHT SOURCE MODULE

CROSS-REFERENCE TO RELATED APPLICATION

This application claims the priority benefit of Taiwan application serial no. 100115159, filed on Apr. 29, 2011. The entirety of the above-mentioned patent application is hereby incorporated by reference herein and made a part of this specification.

BACKGROUND OF THE INVENTION

1. Field of the Invention

The invention relates to an optical device and an optical module. More particularly, the invention relates to a light guide plate (LGP) and a light source module.

2. Description of the Related Art

A conventional light source module is roughly classified into a direct-type light source module and a side-type light source module. In the side-type light source module, a light guide plate (LGP) guides the light emitted by a light emitting device that is configured at the side of the LGP to the front surface of the LGP, so as to form a planar light source. Given the surfaces of the LGP are smooth, the light entering the side of the LGP is totally reflected by the surfaces of the LGP and thus cannot be emitted from the front surface of the LGP. Hence, etching points or screen printed points are configured on the front or rear surface of the conventional LGP, so as to disrupt the total reflection. However, when the total reflection is disrupted by the etching points or the screen printed points, and the light is able to be emitted from the front side of the LGP, the direction of the light often deviates from the direction of the normal line on the front surface of the LGP. As such, a prism sheet is required to be formed on the LGP to correct the direction of light. Use of the prism sheet, however, leads to an increase in the costs and the consumption of optical energy.

In Taiwan Patent No. 581891 (corresponding to U.S. Pat. No. 6,576,887), a bottom surface of an LGP has a retrieving structure, and the retrieving structure has a front guide surface, a rear surface, and a plateau portion. In Taiwan Patent Application Publication No. 200846731, at least one of the bottom surface and the light emitting surface of the LGP has a plurality of micro-structures. In Taiwan Patent Application Publication No. 200530632, the light guide surface of the LGP that faces the light emitting surface has a plurality of net points, and the net points are recessed in the light guide surface. In Taiwan Patent Application Publication No. 200615614, the bottom surface of the LGP contains irregular rough planes and smooth planes. In U.S. Pat. No. 7,153,017, a light incident surface of an optical deviator contains a prismatic plane. In Taiwan Patent No. I222533 (corresponding to U.S. Pat. No. 6,967,698), a liquid crystal display (LCD) device includes a planar light source device, and the planar light source device includes an LGP and a light emitting portion. In Taiwan Patent No. I282021, an LGP having micro-structures that are arranged on the bottom surface of the LGP in a repetitive manner. In Taiwan Patent No. I296352, an LGP has layers of ring-shaped micro-structures. In U.S. Pat. No. 6,454,452, a bottom surface of an LGP has wedge-shaped grooves. In Taiwan Patent No. M321111, an LGP having regularly arranged micro-structures is disclosed. In U.S. Pat. No. 6,612,722, an LGP having micro-structures is disclosed. In U.S. Pat. No. 6,834,973, a bottom surface of an LGP has reflective micro-structures.

SUMMARY OF THE INVENTION

The invention is directed to a light guide plate (LGP) which can guide light in an efficient manner.

The invention is further directed to a light source module which has favorable brightness in the normal direction.

Other advantages of the invention can be further illustrated by the technical features broadly embodied and described as follows.

In order to achieve one or a part of or all of the above advantages or other advantages, an embodiment of the invention provides an LGP that includes a first surface, a second surface, at least one light incident surface, and a plurality of micro-structure sets. The second surface is opposite to the first surface. The light incident surface connects the first surface to the second surface. The micro-structure sets are separately disposed on the second surface, and the micro-structure sets are not continuous in any direction parallel to the first surface. Each of the micro-structure sets includes at least one protrusive structure that protrudes from the second surface and at least one recessive structure that is recessed in the second surface. The protrusive structure includes a first micro-surface and a second micro-surface. The second micro-surface is connected to the first micro-surface. An inclined direction of the first micro-surface is different from an inclined direction of the second micro-surface. The recessive structure includes a third micro-surface and a fourth micro-surface. The fourth micro-surface is connected to the third micro-surface. An inclined direction of the third micro-surface is different from an inclined direction of the fourth micro-surface.

Another embodiment of the invention provides a light source module that includes the aforesaid LGP and at least one light emitting device. The light emitting device is disposed beside the light incident surface of the LGP.

Based on the above, the LGP and the light source module described in the embodiments of the invention include at least one of the following advantages.

The micro-structure sets having the protrusive structures and the recessive structures are applied in the LGP and the light source module according to the embodiments of the invention, and thereby the light can be effectively guided to be in the normal direction by the cooperation of the protrusive structures and the recessive structures. Hence, the LGP described in the embodiments of the invention can guide light efficiently, and the light source module described in the embodiments of the invention has favorable brightness in the normal direction.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7A to FIG. 15A are top views illustrating variations in the micro-structure sets depicted in FIG. 1B.

FIG. 7B to FIG. 15B are three-dimensional views illustrating variations in the micro-structure sets depicted in FIG. 1B.

FIG. 16A and FIG. 16B illustrate the extending principle of the protrusive structures and the recessive structures depicted in FIG. 7A to FIG. 15B.

FIG. 17A is a schematic cross-sectional view illustrating a light source module according to still another embodiment of the invention.

DESCRIPTION OF EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
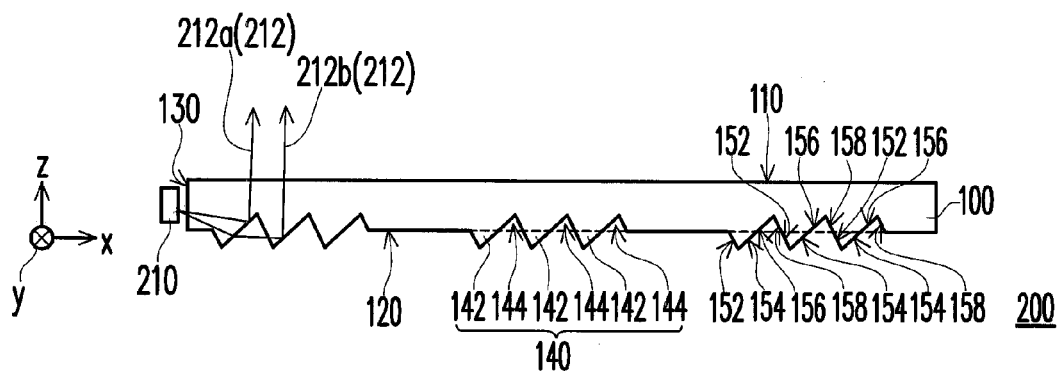
FIG. 1A is a schematic cross-sectional view illustrating a light source module according to an embodiment of the invention.
Figure 1B:
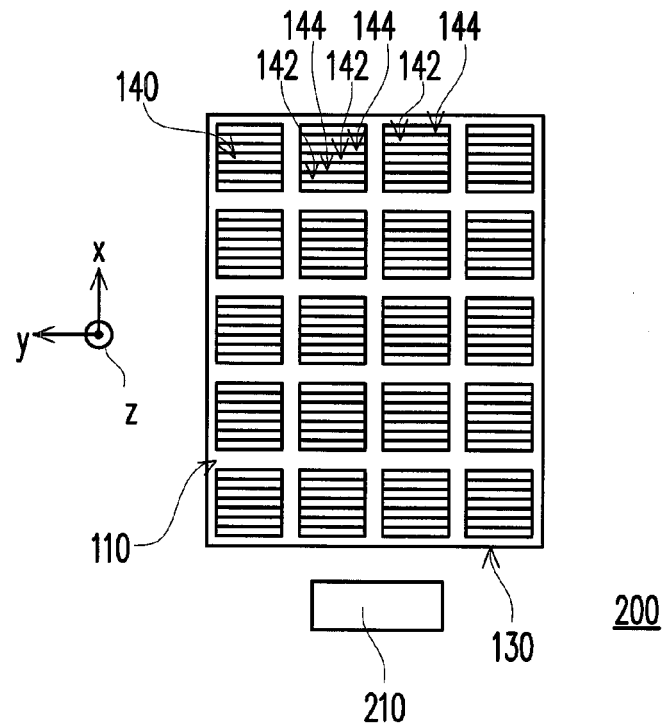
FIG. 1B is a schematic top view illustrating the light source module depicted in FIG. 1A.

FIG. 1A is a schematic cross-sectional view illustrating a light source module according to an embodiment of the invention. FIG. 1B is a schematic top view illustrating the light source module depicted in FIG. 1A. With reference to FIG. 1A and FIG. 1B, the light source module 200 of this embodiment includes an LGP 100 and at least one light emitting device 210. In FIG. 1A and FIG. 1B, one light emitting device 110 is exemplarily depicted. The LGP 100 includes a first surface 110, a second surface 120, at least one light incident surface 130, and a plurality of micro-structure sets 140. In FIG. 1A and. FIG. 1B, one light incident surface is exemplarily depicted. The second surface 120 is opposite to the first surface 110. The light incident surface 130 connects the first surface 110 to the second surface 120. The micro-structure sets 140 are separately disposed on the second surface 120.

To better describe the directions of components in the light source module 200 and the structure of the light source module 200, a coordinate system is defined herein. The coordinate system includes x, y, and z axes that are perpendicular to one another. The y-z plane is substantially parallel to the light incident surface 130, for instance, and the x-y plane is substantially parallel to the first surface 110, for instance.

The micro-structure sets 140 are not continuous in any direction parallel to the first surface 110. Namely, the micro-structure sets 140 are separately disposed in any direction parallel to the x-y plane. Each of the micro-structure sets 140 includes at least one protrusive structure 142 and at least one recessive structure 144. In FIG. 1A, three protrusive structures 142 and three recessive structures 144 are exemplarily shown. The protrusive structures 142 protrude from the second surface 120, and the recessive structures 144 are recessed in the second surface 120. Each protrusive structure 142 includes a first micro-surface 152 and a second micro-surface 154. The second micro-surface 154 is connected to the first micro-surface 152. An inclined direction of the first micro-surface 152 is different from an inclined direction of the second micro-surface 154. In this embodiment, the inclined direction of the first micro-surface 152 is opposite to the inclined direction of the second micro-surface 154.

Each recessive structure 144 includes a third micro-surface 156 and a fourth micro-surface 158. The fourth micro-surface 158 is connected to the third micro-surface 156. An inclined direction of the third micro-surface 156 is different from an inclined direction of the fourth micro-surface 158. In this embodiment, the inclined direction of the third micro-surface 156 is opposite to the inclined direction of the fourth micro-surface 158.

The light emitting device 210 is disposed beside the light incident surface 130 of the LGP 100. According to this embodiment, the light emitting device 210 is a light emitting diode (LED), for instance. However, in other embodiments of the invention, the light emitting device 210 could be a cold cathode fluorescent lamp (CCFL) or any other appropriate light emitting device. In addition, according to another embodiment of the invention, the light emitting device 210 could be plural, and the plural light emitting devices 210 are arranged beside the light incident surface 130 along the y-axis direction.

Figure 2:
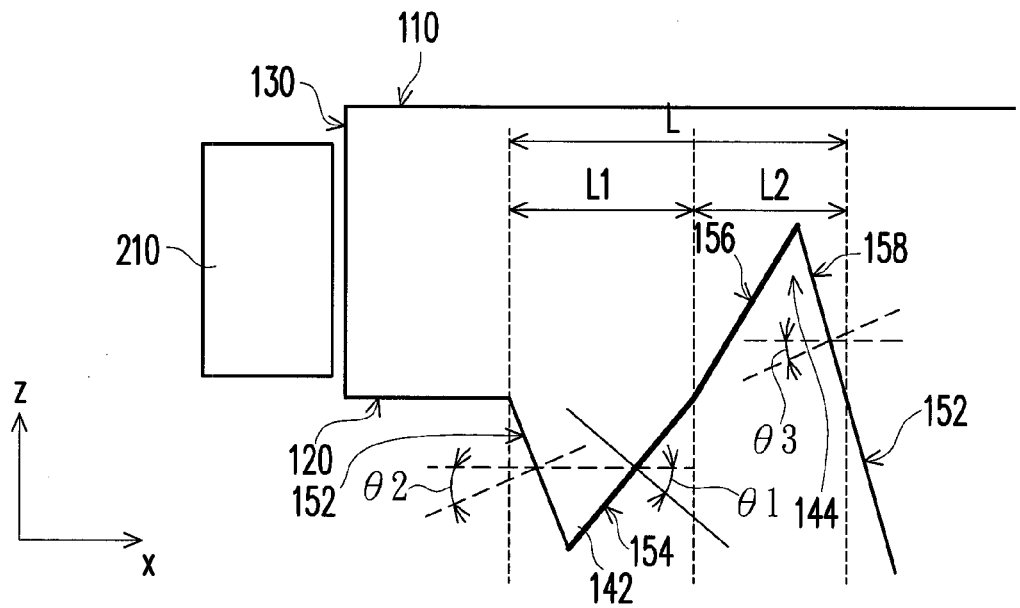
FIG. 2 is a partial, enlarged view illustrating the light source module depicted in FIG. 1A.

FIG. 2 is a partial, enlarged view illustrating the light source module depicted in FIG. 1A. With reference to FIG. 1A, FIG. 1B, and FIG. 2, in this embodiment, the first micro-surface 152 is located between the light incident surface 130 and the second micro-surface 154, and the third micro-surface 156 is located between the light incident surface 130 and the fourth micro-surface 158. Besides, in this embodiment, the third micro-surface 156 is connected to the second micro-surface 154, and the second micro-surface 154 and the third micro-surface 156 are located between the first micro-surface 152 and the fourth micro-surface 158. According to this embodiment, an inclined angle θ1 of a normal line at any point on the second micro-surface 154 and on the third micro-surface 156 with respect to the second surface 120 is greater than or equal to 30 degrees and less than or equal to 70 degrees. In this embodiment, an inclined angle θ2 of a normal line at any point on the first micro-surface 152 with respect to the second surface 120 is greater than or equal to 0 degree and less than or equal to 85 degrees, and an inclined angle θ3 of a normal line at any point on the fourth micro-surface 158 with respect to the second surface 120 is greater than or equal to 0 degree and less than or equal to 20 degrees. Due to the individual design of the inclined angles θ1, θ2, and θ3 or the combined range design of the inclined angles θ1, θ2, and θ3, the light source module 200 of this embodiment could have favorable light emitting efficiency in the normal direction (i.e., the z-axis direction), and the emitted light could be collected more at a right view angle in the z-axis direction (i.e., the emitted light is collected at the 0-degree view angle). If the inclined angles θ1, θ2, and θ3 do not fall within the range described above, the optical effects achieved by the light source module 200 are not as favorable as the optical effects accomplished by the conventional side-type light source module.

The protrusive structure 142 of this embodiment is a bar-shaped protrusion that extends in a direction parallel to the second surface 120, as indicated in FIG. 1B. Besides, the recessive structure 144 is a bar-shaped recess that extends in the direction parallel to the second surface 120, as indicated in FIG. 1B. According to this embodiment, the protrusive structure 142 and the recessive structure 144 that extend in the direction parallel to the second surface 120 have a straight-line shape, e.g., the protrusive structure 142 and the recessive structure 144 extend in the y-axis direction.

Each of the micro-structure sets 140 in this embodiment has a width L in an arrangement direction of the protrusive structure 142 and the recessive structure 144. The arrangement direction in this embodiment is the x-axis direction, for instance, and the width L is greater than or equal to 6 μm and less than or equal to 2000 μm. Each of the protrusive structure 142 and the recessive structure 144 has a width in the arrangement direction, and the width of each of the protrusive structure 142 and the recessive structure 144 is greater than or equal to 3 μm and less than or equal to 1000 μm. For instance, the protrusive structure 142 has a width L1 in the arrangement direction of the protrusive structure 142 and the recessive structure 144, and the width L1 is greater than or equal to 3 μm and less than or equal to 1000 μm; the recessive structure 144 has a width L2 in the arrangement direction of the protrusive structure 142 and the recessive structure 144, and the width L2 is greater than or equal to 3 μm and less than or equal to 1000 μm. The width L1 could be the same as or different from the width L2.

In this embodiment, the number of the protrusive structure 142 and the recessive structure 144 in each of the micro-structure sets 140 is greater than or equal to 3 in total, and the protrusive structure 142 and the recessive structure 144 in each of the micro-structure sets 140 are alternately arranged on the second surface 120 (e.g., arranged in the x-axis direction in this embodiment). Namely, the number of the protrusive structure 142 in each micro-structure set 140 is m, for instance, and the number of the recessive structure 144 in each micro-structure set 140 is n, for instance. In this embodiment, m+n≥3, m≥1, and n≥1. Nonetheless, in another embodiment of the invention, m=1 and n=1. FIG. 3(a) to FIG. 3(e) show five micro-structure sets in which m=1 and n=1; m=2 and n=2; m=3 and n=3; m=1 and n=2; m=2 and n=1, respectively.

Besides, a connection portion between the protrusive structure 142 and the recessive structure 144 excludes any plane parallel to the second surface 120 according to this embodiment. That is to say, the protrusive structure 142 closely or directly adjoins the recessive structure 144, for instance. According to this embodiment, the second micro-surface 154 of the protrusive structure 142 and the third micro-surface 156 of the recessive structure 144 are connected in a bent manner, and the bent portion does not include any plane parallel to the second surface 120. However, in other embodiments of the invention, the second and third micro-surfaces 154 and 156 could be connected in a smooth manner. For instance, the second and third micro-surfaces 154 and 156 are coplanar and are assembled to form a plane.

Figure 3:
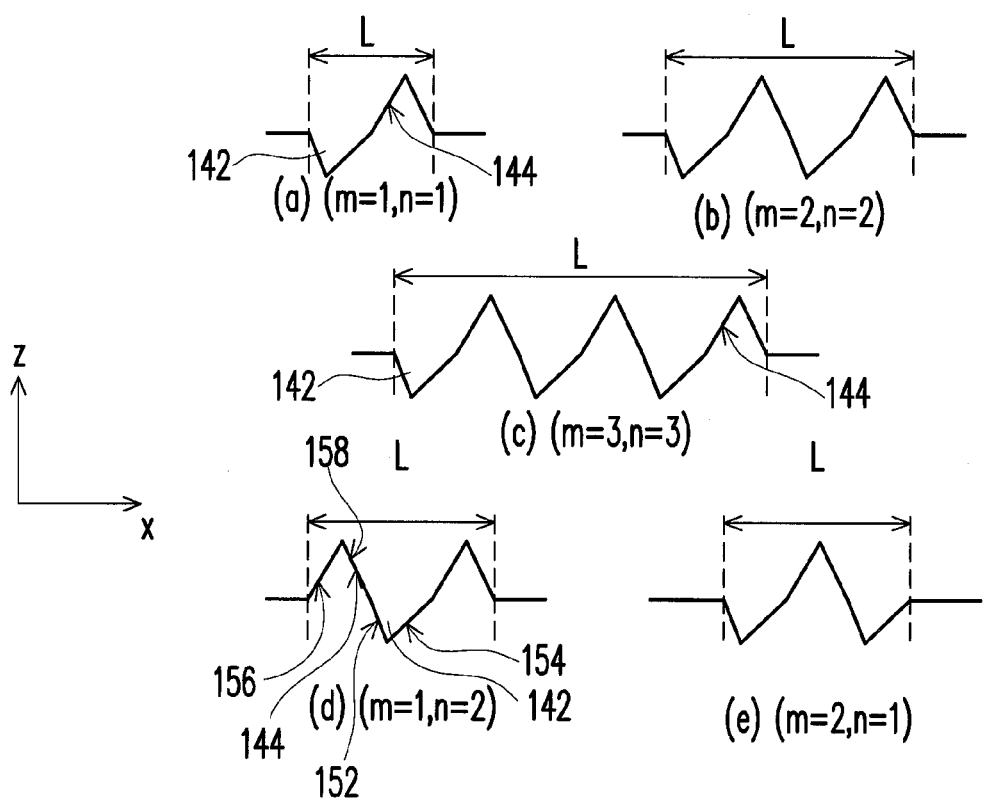
FIG. 3(a) to FIG. 3(e) illustrate variations in the micro-structure sets depicted in FIG. 1A.

With reference to FIG. 3(d), in another embodiment of the invention, the fourth micro-surface 158 could be connected to the first micro-surface 152, and the first micro-surface 152 and the fourth micro-surface 158 are located between the third micro-surface 156 and the second micro-surface 154. The recessive structure 144 could be located between the light incident surface 130 and the protrusive structure 142. In the embodiment shown in FIG. 3(d), when each of the micro-structure sets 140 is observed in a direction away from the light incident surface 130, the recessive structure 144 is seen first, and the protrusive structure 142 and the recessive structure 144 are then sequentially observed. However, according to the embodiment shown in FIG. 1A, when each micro-structure set 140 is observed in the direction away from the light incident surface 130, the protrusive structure 142 is seen first, and the recessive structure 144, the protrusive structure 142, the recessive structure 144, the protrusive structure 142, and the recessive structure 144 are then observed in sequence. Namely, when each micro-structure set 140 is observed in the direction away from the light incident surface 130, whether the protrusive structure 142 or the recessive structure 144 is seen first should not be construed as a limitation to the invention.

With reference to FIG. 1A and FIG. 1B, in the LGP 100 and the light source module 200 of this embodiment, the microstructure sets 140 having the protrusive and recessive structures 142 and 144 are applied. Hence, due to the protrusive and recessive structures 142 and 144, the light 212 emitted by the light emitting device 210 could be effectively guided to be in the normal direction (i.e., the z-axis direction). That is to say, the LGP 100 of this embodiment could guide light efficiently, and the light source module 200 of this embodiment has favorable brightness in the normal direction (i.e., the z-axis direction). Particularly, the light 212 emitted by the light emitting device 210 is capable of entering the LGP 100 from the light incident surface 130. When the light 212 (e.g., the light 212a) is transmitted to the third micro-surface 156, the third micro-surface 156 is capable of reflecting the light 212a toward the z-axis direction. On the other hand, when the light 212 (e.g., the light 212b) is transmitted to the second micro-surface 154, a portion of the light 212b may pass through the second micro-surface 154 due to the overly small light incident angle. Owing to the refraction of the second micro-surface 154, the light is then transmitted to the next protrusive structure 142 in the micro-structure set 140, passes through the first micro-surface 152 of the protrusive structure 142, and is then reflected by the second micro-surface 154 of the protrusive structure 142 in an upward manner toward the z-axis direction. Thereby, the light 212a and the light 212b are both emitted toward the normal direction (i.e., the z-axis direction) from the first surface 110 of the LGP 100. Hence, in this embodiment, it is not necessary to place the prism sheet above the LGP 100 for correcting the direction of the light 212 emitted from the LGP 100 (i.e., guiding the light 212 toward the z-axis direction).

The optical effects of the light 212a and the light 212b caused by the micro-structure sets 140 are exemplary and could have other variations. Generally, a portion of the light 212 which could not be guided toward the normal direction (i.e., the z-axis direction) by the first protrusive structure 142 or the first recessive structure 144 that is closest to the light incident surface 130 arrives at the next protrusive structure 142 or the next recessive structure 144, and thereby the portion of the light 212 could be guided toward the normal direction. Given the portion of the light 212 still could not be fully guided toward the normal direction, the non-guided part of light is then transmitted to the third protrusive structure 142 or the third recessive structure 144 and guided toward the normal direction by the third protrusive structure 142 or the third recessive structure 144. As such, when the light 212 is continuously guided toward the normal direction by the protrusive structures 142 or the recessive structures 144, most of the light 212 could be guided toward the normal direction. Hence, in the light source module 200 of this embodiment, it is not necessary to place a reflective film on the second surface 120 for reflecting the light 212, and the light source module 200 could still have favorable brightness in the normal direction.

Since the light source module 200 having no prism sheet or reflective film could still have favorable brightness in the normal direction, the costs of the light source module 200 are lowered down. Moreover, the light 212 is not lost due to the prism sheet and the reflective film. Therefore, the light source module 200 in this embodiment does not have a great light loss and could have favorable optical efficiency.

FIG. 4(a) to FIG. 4(f) illustrate variations in the protrusive structures and the recessive structures depicted in FIG. 1A.

Figure 4:
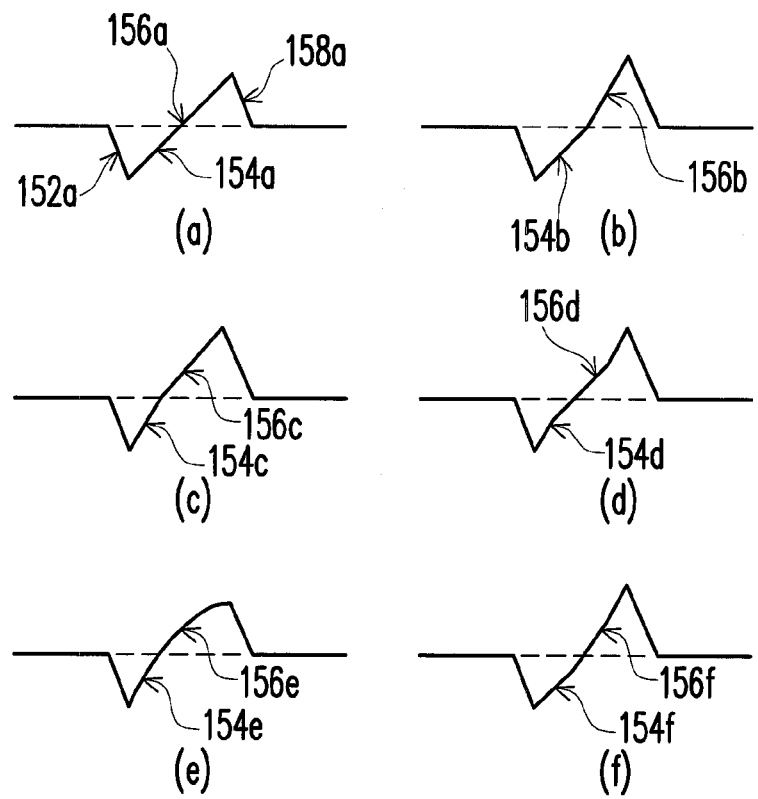
FIG. 4(a) to FIG. 4(f) illustrate variations in the protrusive structures and the recessive structures depicted in FIG. 1A.

With reference to FIG. 1A and FIG. 4(a) to FIG. 4(f), in this embodiment, each cross-sectional line obtained by cutting the first micro-surface 152, the second micro-surface 154, the third micro-surface 156, and the fourth micro-surface 158 along a direction perpendicular to the second surface 120 (e.g., along a direction parallel to the x-z plane) is a straight line, a curve, or a bent line constituted by a plurality of straight lines having different slopes. For instance, the cross-sectional line of the first micro-surface 152a, the cross-sectional line of the second micro-surface 154a, the cross-sectional line of the third micro-surface 156a, and the cross-sectional line of the fourth micro-surface 158a as depicted in FIG. 4(a) are straight lines, respectively, and the cross-sectional lines of the second and third micro-surfaces 154a and 156a are connected to form a straight line. In FIG. 4(b), each of the cross-sectional line of the second micro-surface 154b and the cross-sectional line of the third micro-surface 156b is a straight line, and the cross-sectional lines of the second and third micro-surfaces 154b and 156b are connected to form a bent line. In FIG. 4(c), the cross-sectional lines of the second and third micro-surfaces 154c and 156c are connected to form a bent line, while the bent direction of the bent line in FIG. 4(c) is opposite to that in FIG. 4(b). In FIG. 4(d), each of the cross-sectional lines of the second and third micro-surfaces 154d and 156d is a bent line constituted by two straight lines having different slopes, and a connection portion between the cross-sectional lines of the second and third micro-surfaces 154d and 156d is smooth. However, in another embodiment of the invention, the cross-sectional lines of the second and third micro-surfaces 154d and 156d could be connected in a bent manner. In FIG. 4(e), each of the cross-sectional lines of the second and third micro-surfaces 154e and 156e is a curve, and the cross-sectional lines of the second and third micro-surfaces 154e and 156e are connected in a smooth manner to form a curve. In FIG. 4(f), each of the cross-sectional lines of the second and third micro-surfaces 154f and 156f is a bent line respectively constituted by two straight lines having different slopes, while the bent directions of the bent lines in FIG. 4(f) is different from that in FIG. 4(d).

Figure 5:
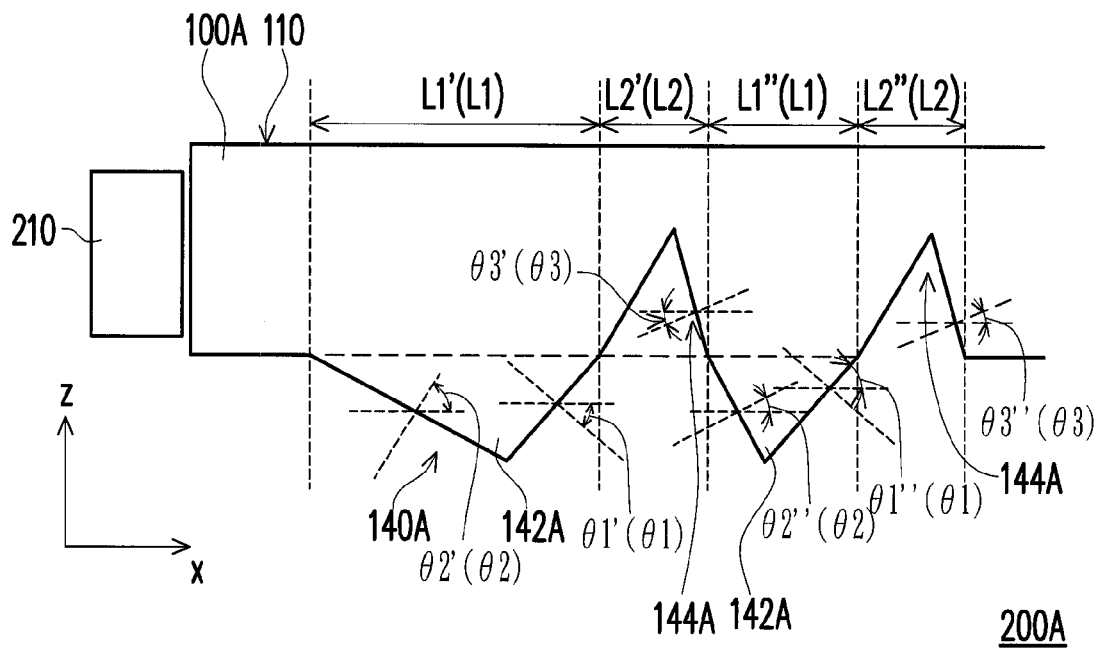
FIG. 5 is a partial cross-sectional view illustrating a light source module according to another embodiment of the invention.

FIG. 5 is a partial cross-sectional view illustrating a light source module according to another embodiment of the invention. The light source module 200A of this embodiment is similar to the light source module 200 depicted in FIG. 1A and FIG. 2, while the difference therebetween is described below. In FIG. 1A and FIG. 2, the inclined angles θ1, θ2, and θ3 of any pair of adjoining protrusive structure 142 and recessive structure 144 are substantially equal to the inclined angles θ1, θ2, and θ3 of any other pair of adjoining protrusive structure 142 and recessive structure 144, respectively. However, the inclined angles θ1, θ2, and θ3 of different pairs of adjoining protrusive structures 142 and recessive structures 144 in this embodiment are different or are not completely the same. For instance, the inclined angle θ1' is not equal to the inclined angle θ1"; the inclined angle θ2' is not equal to the inclined angle θ2"; the inclined angle θ3' is not equal to the inclined angle θ3". Besides, in FIG. 1A and FIG. 2, the width L1 of each protrusive structure 142 is substantially equal, and the width L2 of each recessive structure 144 is substantially equal as well. Nonetheless, in the LGP 100A of this embodiment, the width L1 of each of the protrusive structures 142A in each micro-structure set 140A is different or is not completely the same, and the width L2 of each of the recessive structures 144A in each micro-structure set 140A is different or is not completely the same. For instance, the width L1' is not equal to the width L1"; the width L2' is not equal to the width L2".

As such, the light 212 emitted from the first surface 110 could be appropriately spread on a plane parallel to the x-z plane, so as to comply with the users' demands. For instance, when a liquid crystal panel is disposed on the light source module 200A, the resultant LCD could have wide view angle.

Figure 6:
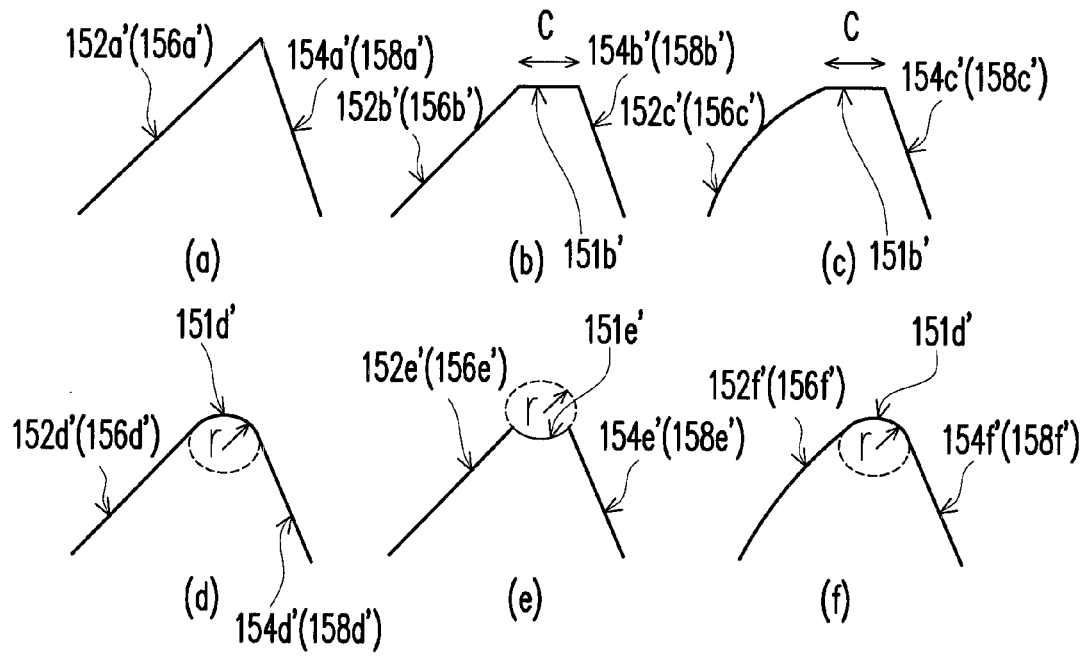
FIG. 6(a) to FIG. 6(f) illustrate variations in the protrusive structures and the recessive structures depicted in FIG. 1A.

FIG. 6(a) to FIG. 6(f) illustrate variations in the protrusive structures and the recessive structures depicted in FIG. 1A. With reference to FIG. 1A and FIG. 6(a) to FIG. 6(f), each of the connection portion between the first micro-surface 152 and the second micro-surface 154 and the connection portion between the third micro-surface 156 and the fourth micro-surface 158 has a chamfer or a sharp angle, and the chamfer is a beveled edge, a protrusive round angle, or a recessive round angle, for instance. As shown in FIG. 6(a), the connection portion between the first micro-surface 152a' (or the third micro-surface 156a') and the second micro-surface 154a' (or the fourth micro-surface 158a') has a sharp angle, for instance. In FIG. 6(b), the connection portion between the first micro-surface 152W (or the third micro-surface 156b') and the second micro-surface 154W (or the fourth micro-surface 158b') has a beveled edge 151b', and the width C of the beveled edge 151b' is greater than 0 μm and smaller than or equal to 10 μm, for instance. In FIG. 6(c), the connection portion between the first micro-surface 152c' (or the third micro-surface 156c') and the second micro-surface 154c' (or the fourth micro-surface 158c') has a beveled edge 151b', and the first micro-surface 152c' (or the third micro-surface 156c') is a curved surface, for instance. In FIG. 6(d), the connection portion between the first micro-surface 152d' (or the third micro-surface 156d') and the second micro-surface 154d' (or the fourth micro-surface 158d') has a protrusive round angle 151d' (or a recessive round angle 151d'), and the radius r of curvature of the round angle 151d' is greater than 0 μm and smaller than or equal to 100 μm, for instance. In FIG. 6(e), the connection portion between the first micro-surface 152e' (or the third micro-surface 156e') and the second micro-surface 154e' (or the fourth micro-surface 158e') has a recessive round angle 151e' (or a protrusive round angle 151e'), and the radius r of curvature of the round angle 151e' is greater than 0 μm and smaller than or equal to 100 μm, for instance. In FIG. 6(f), the connection portion between the first micro-surface 152f' (or the third micro-surface 156f') and the second micro-surface 154f' (or the fourth micro-surface 158f') has a protrusive round angle 151d' (or a recessive round angle 151d'), the radius r of curvature of the round angle 151d' is greater than 0 μm and smaller than or equal to 100 μm, for instance, and the first micro-surface 152f' (or the third micro-surface 156f') is a curved surface, for instance.

Figure 7A:
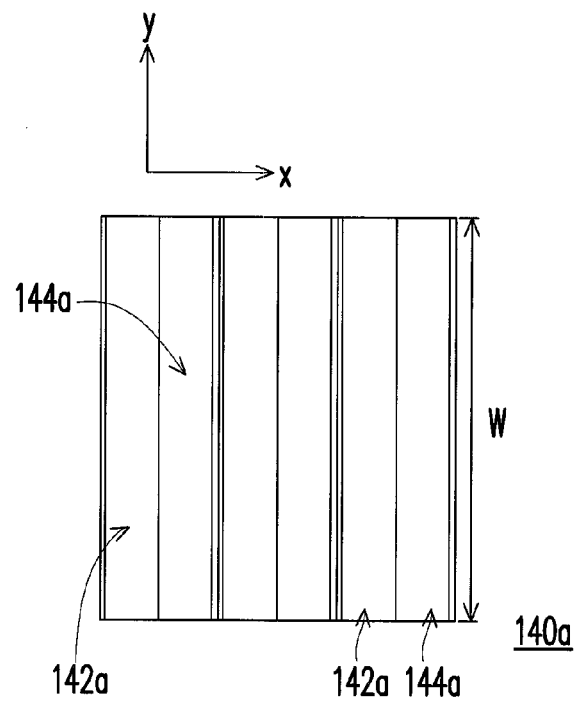
Figure 7B:
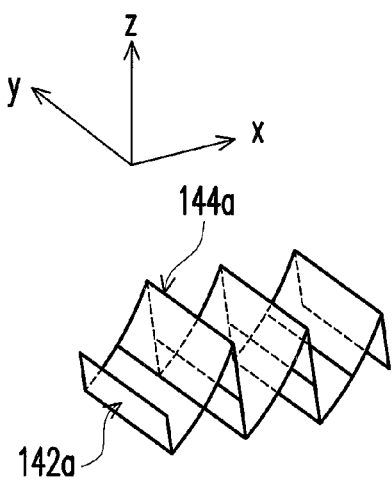
Figure 10A:
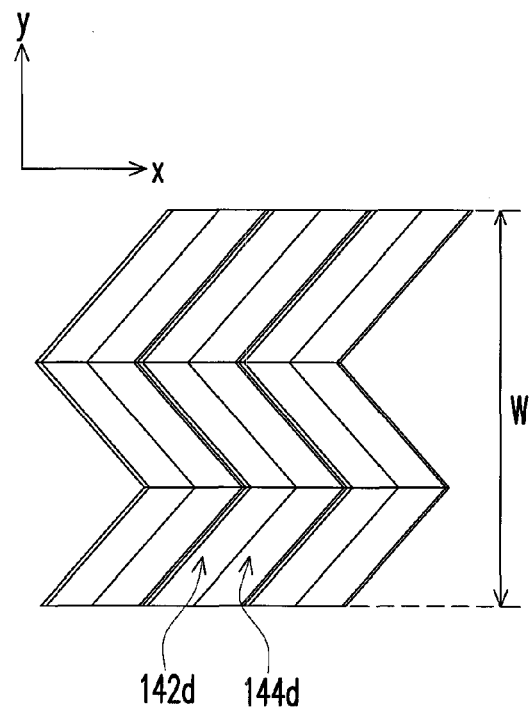
Figure 10B:
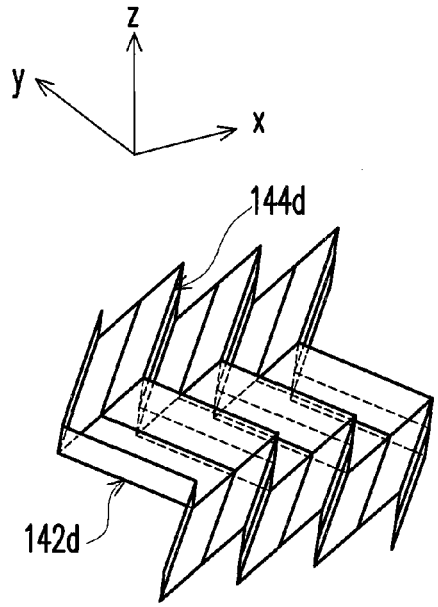
Figure 11A:
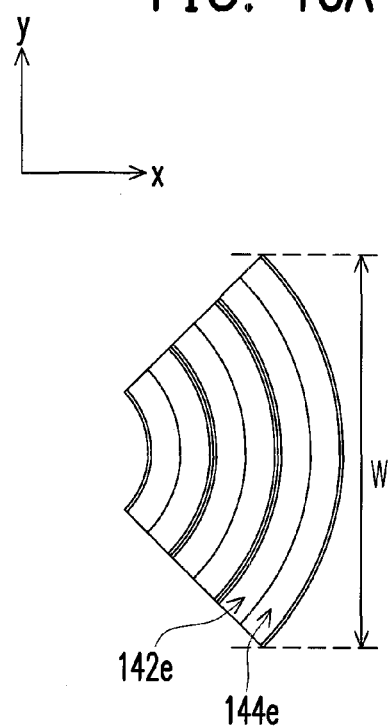
Figure 11B:
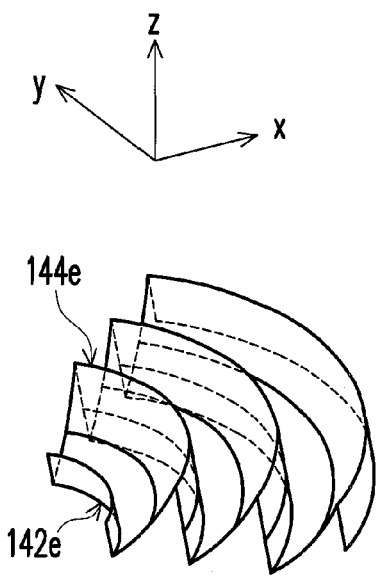
Figure 14A:
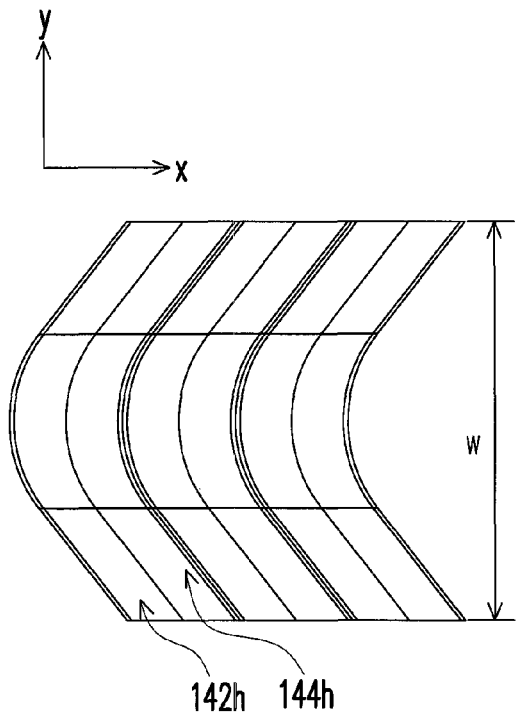
Figure 14B:
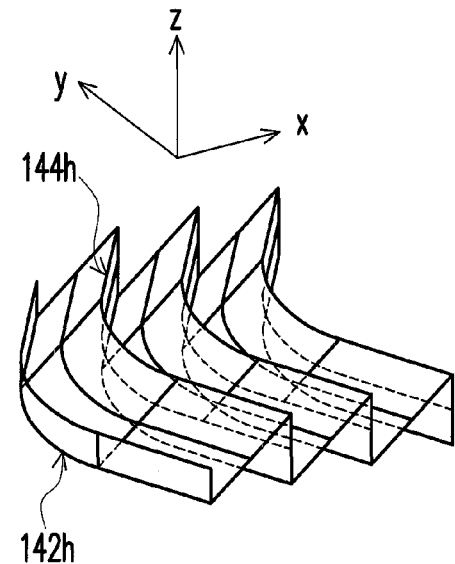
Figure 15A:
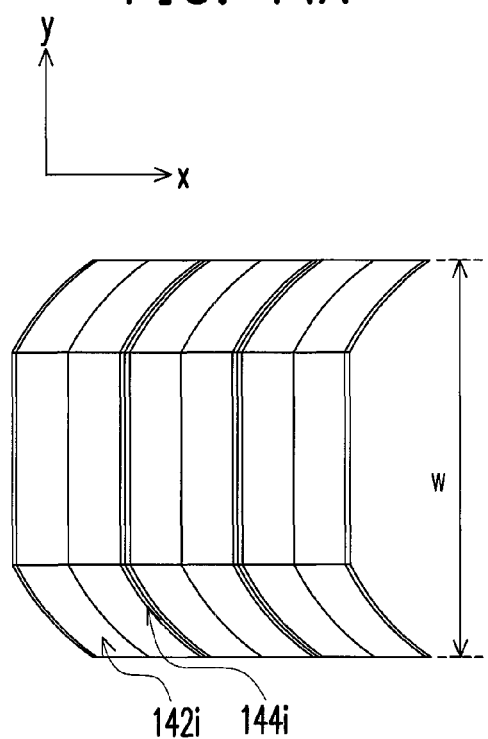
Figure 15B:
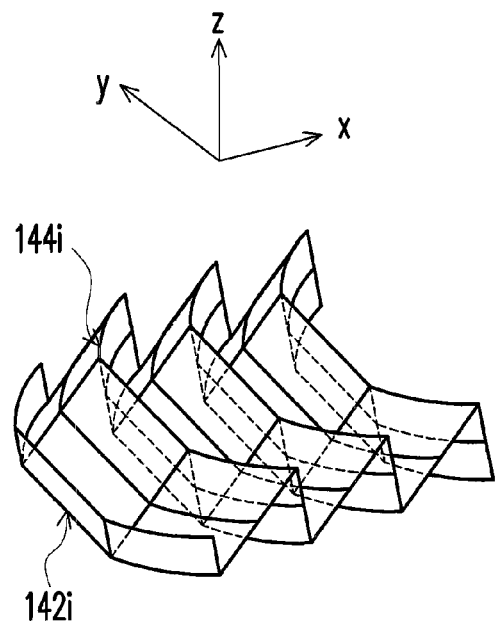

FIG. 7A to FIG. 15A are top views illustrating variations in the micro-structure sets depicted in FIG. 1B. FIG. 7B to FIG. 15B are three-dimensional views illustrating variations in the micro-structure sets depicted in FIG. 1B. With reference to FIG. 1A, FIG. 1B, and FIG. 7A to FIG. 15B, in each micro-structure set 140, the protrusive structures 142 and the recessive structures 144 extending in the direction parallel to the second surface 120 have a straight-line shape, a V shape, an N shape, a W shape, a zigzag shape, an arc shape, a wave shape, a shape of at least one arc and at least one straight line connected to each other, or any other appropriate shape. For instance, as indicated in FIG. 7A and FIG. 7B, the protrusive structures 142a and the recessive structures 144a extending in the direction parallel to the second surface 120 (e.g., the y-axis direction) have a straight-line shape, and the maximum width W of the micro-structure set 140a is greater than 1 μm and smaller than 2000 μm. In FIG. 8A and FIG. 8B, the protrusive structures 142b and the recessive structures 144b extending in the direction parallel to the second surface 120 have a V shape, and the tips of the V-shaped extensions face the direction away from the light incident surface 130 (i.e., the x-axis direction), for instance. In FIG. 9A and FIG. 9B, the protrusive structures 142c and the recessive structures 144c extending in the direction parallel to the second surface 120 have a V shape, and the tips of the V-shaped extensions face the direction of the light incident surface 130 (i.e., the minus x-axis direction), for instance. In FIG. 10A and FIG. 10B, the protrusive structures 142d and the recessive structures 144d extending in the direction parallel to the second surface 120 have an N shape, while the protrusive structures 142d and the recessive structures 144d extending in the direction parallel to the second surface 120 could have a W shape, a zigzag shape, a shape of a plurality of Vs connected together, a shape of a plurality of Ns connected together, or a shape of a plurality of Vs and Ns connected together according to other embodiments of the invention. In FIG. 11A and FIG. 11B, the protrusive structures 142e and the recessive structures 144e extending in the direction parallel to the second surface 120 have an arc shape, and the openings of the arc-shaped extensions face the light incident surface 130. In FIG. 12A and FIG. 12B, the protrusive structures 142f and the recessive structures 144f extending in the direction parallel to the second surface 120 have an arc shape, and the openings of the arc-shaped extensions face the direction away from the light incident surface 130. In FIG. 13A and FIG. 13B, the protrusive structures 142g and the recessive structures 144g extending in the direction parallel to the second surface 120 have a wave shape. In FIG. 14A and FIG. 14B, the protrusive structures 142h and the recessive structures 144h extending in the direction parallel to the second surface 120 have a shape of one arc and two straight lines. Here, the arc connects the two straight lines. In FIG. 15A and FIG. 15B, the protrusive structures 142i and the recessive structures 144i extending in the direction parallel to the second surface 120 have a shape of one straight line and two arcs. Here, the straight line connects the two arcs.

FIG. 16A and FIG. 16B illustrate the extending principle of the protrusive structures and the recessive structures depicted in FIG. 7A to FIG. 15B. With reference to FIGS. 16A and 16B, the line P denotes the extension direction of the protrusive structure and the recessive structure, H represents a reference straight line parallel to the x-axis direction, and the tangent line T is a tangent line of a point K on the line P. In this embodiment, an included angle δ between the reference straight line H and the tangent line T of any point K on the line P is greater than or equal to 0 degree and less than or equal to 180 degrees. In other embodiments of the invention, the extensions of the protrusive structures and the recessive structures could also have other shapes based on said extending principle.

Figure 17B:
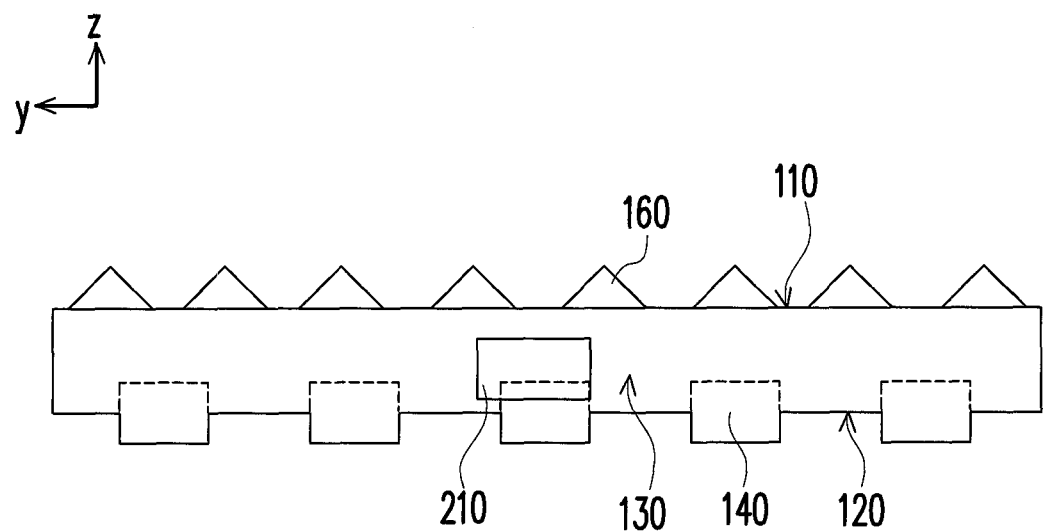
FIG. 17B is a schematic side view illustrating the light source module depicted in FIG. 17A from another angle.
Figure 17C:
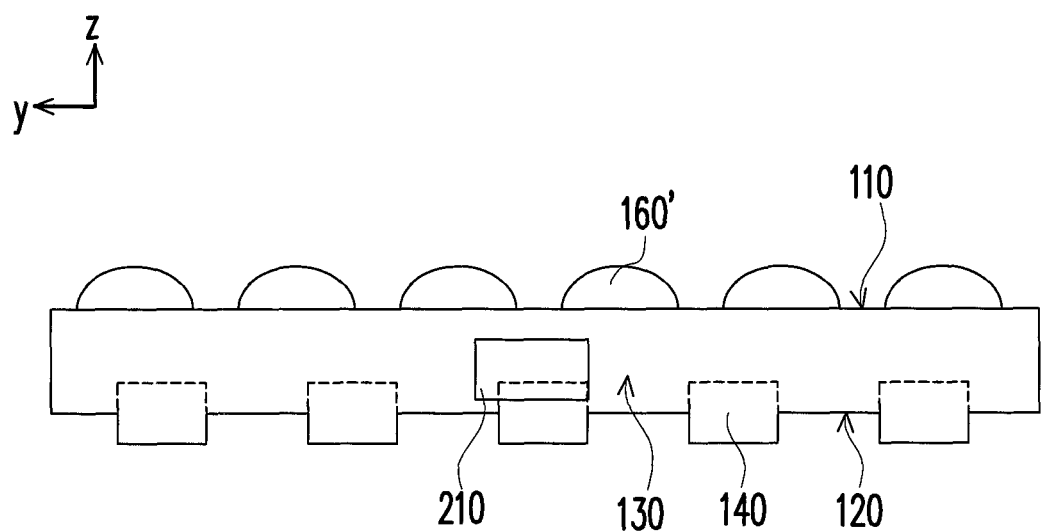
FIG. 17C and FIG. 17D illustrate another two variations in the LGP depicted in FIG. 17A.
Figure 17D:
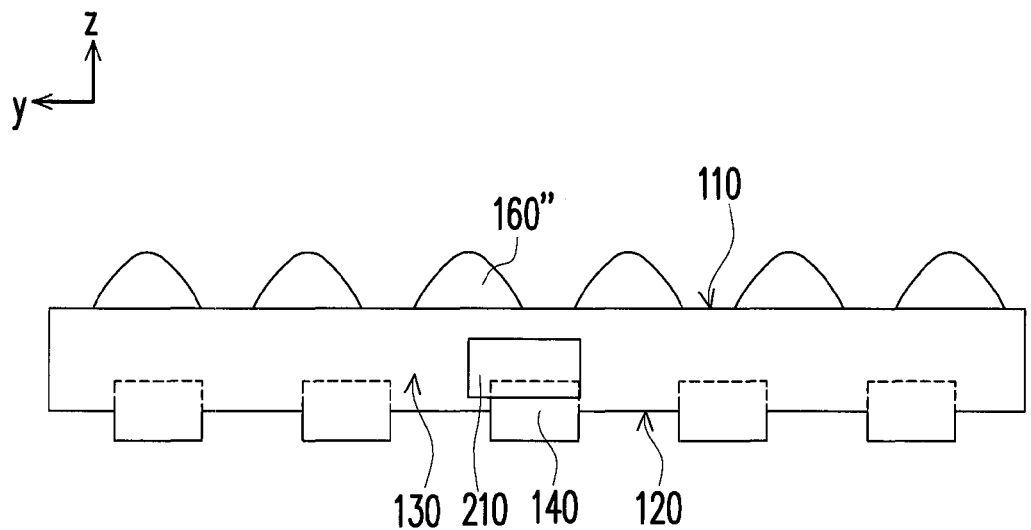

FIG. 17A is a schematic cross-sectional view illustrating a light source module according to still another embodiment of the invention. FIG. 17B is a schematic side view illustrating the light source module depicted in FIG. 17A from another angle. With reference to FIG. 17A and FIG. 17B, the light source module 200B of this embodiment is similar to the light source module 200 depicted in FIG. 1A, while the difference therebetween lies in that the LGP 100B of the light source module 200B in this embodiment further includes a plurality of bar-shaped protrusions 160 disposed on the first surface 110. Each of the bar-shaped protrusions 160 extends along a direction substantially perpendicular to the light incident surface 130, and the bar-shaped protrusions 160 are arranged along a direction substantially parallel to the light incident surface 130. The bar-shaped protrusions 160 of this embodiment are columnar prisms (e.g., triangular columns). However, the bar-shaped protrusions 160' in another embodiment could have a semi-cylindrical shape, as shown in FIG. 17C; the bar-shaped protrusions 160" in still another embodiment could be shaped as aspheric columnar lenses, as indicated in FIG. 17D. The bar-shaped protrusions 160, 160', and 160" allow the light 212 to converge on a plane parallel to the y-z plane, and thereby the light source module 200B could have favorable brightness in the normal direction.

Figure 18:
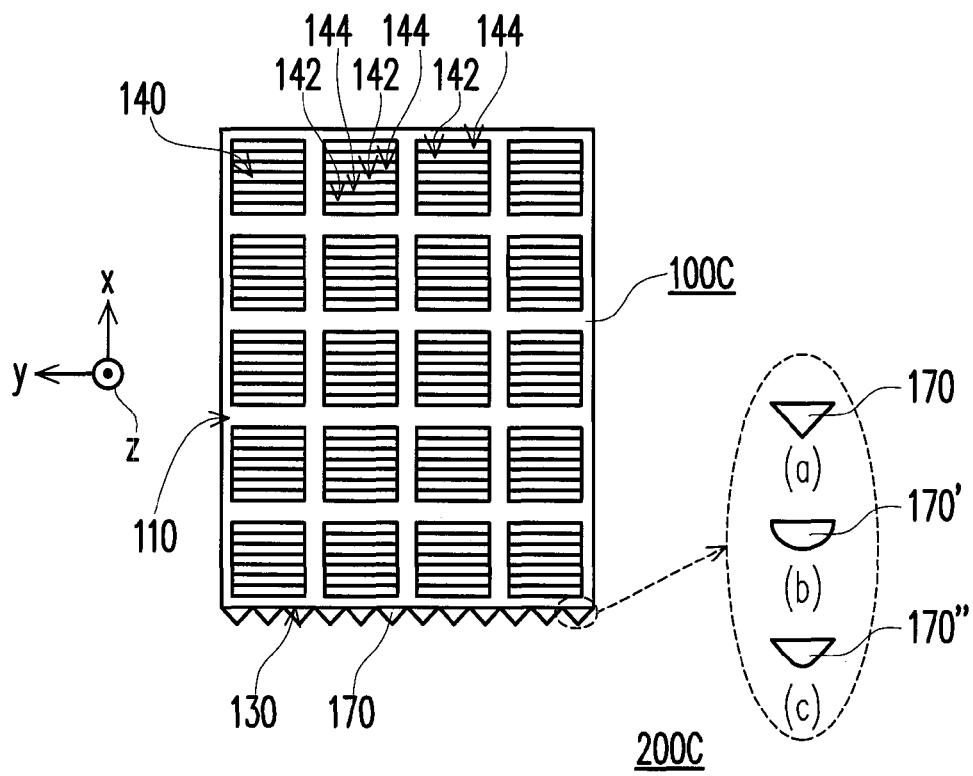
FIG. 18 is a schematic top view illustrating a light source module according to still another embodiment of the invention.

FIG. 18 is a schematic top view illustrating a light source module according to still another embodiment of the invention. With reference to FIG. 18, the light source module 200C of this embodiment is similar to the light source module 200 depicted in FIG. 1B, while the difference therebetween lies in that the LGP 100C of the light source module 200C in this embodiment further includes a plurality of bar-shaped protrusions 170 disposed on the light incident surface 130. Each of the bar-shaped protrusions 170 extends along a direction substantially perpendicular to the first surface 110 (i.e., along the z-axis direction), and the bar-shaped protrusions 170 are arranged along a direction substantially parallel to the first surface 110 (e.g., along the y-axis direction). The bar-shaped protrusions 170 of this embodiment are columnar prisms (e.g., triangular columns as shown in FIG. 18(a)). However, the bar-shaped protrusions 170' in another embodiment could have a semi-cylindrical shape, as shown in FIG. 18(b); the bar-shaped protrusions 170" in still another embodiment could be shaped as aspheric columnar lenses, as indicated in FIG. 18(c).

Figure 19:
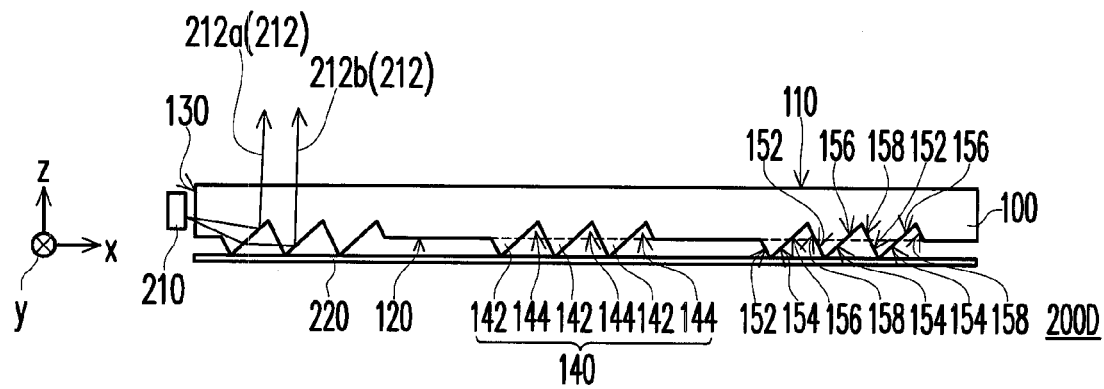
FIG. 19 is a schematic cross-sectional view illustrating a light source module according to another embodiment of the invention.

FIG. 19 is a schematic cross-sectional view illustrating a light source module according to another embodiment of the invention. With reference to FIG. 19, the light source module 200D of this embodiment is similar to the light source module 200 depicted in FIG. 1A, while the difference therebetween lies in that the light source module 200D of this embodiment further includes a reflective unit 220 disposed on the second surface 120. The reflective unit 220 is a reflective film, for instance. Here, the reflective unit 220 could reflect the light (leaked from the second surface 120 or the micro-structure sets 140) back to the LGP 100, so as to re-use the optical energy.

Figure 20:
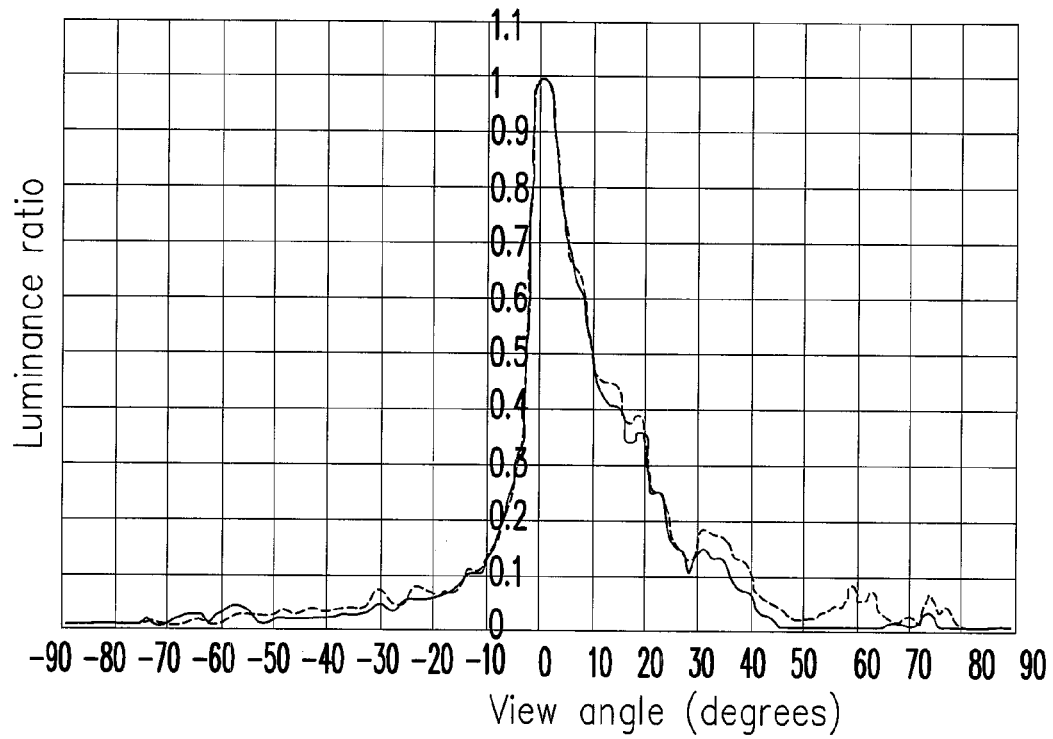
FIG. 20 illustrates the comparison between the luminance distribution ratio of the light source module depicted in FIG. 1A and the luminance distribution ratio of the light source module depicted in FIG. 19.
Figure 21:
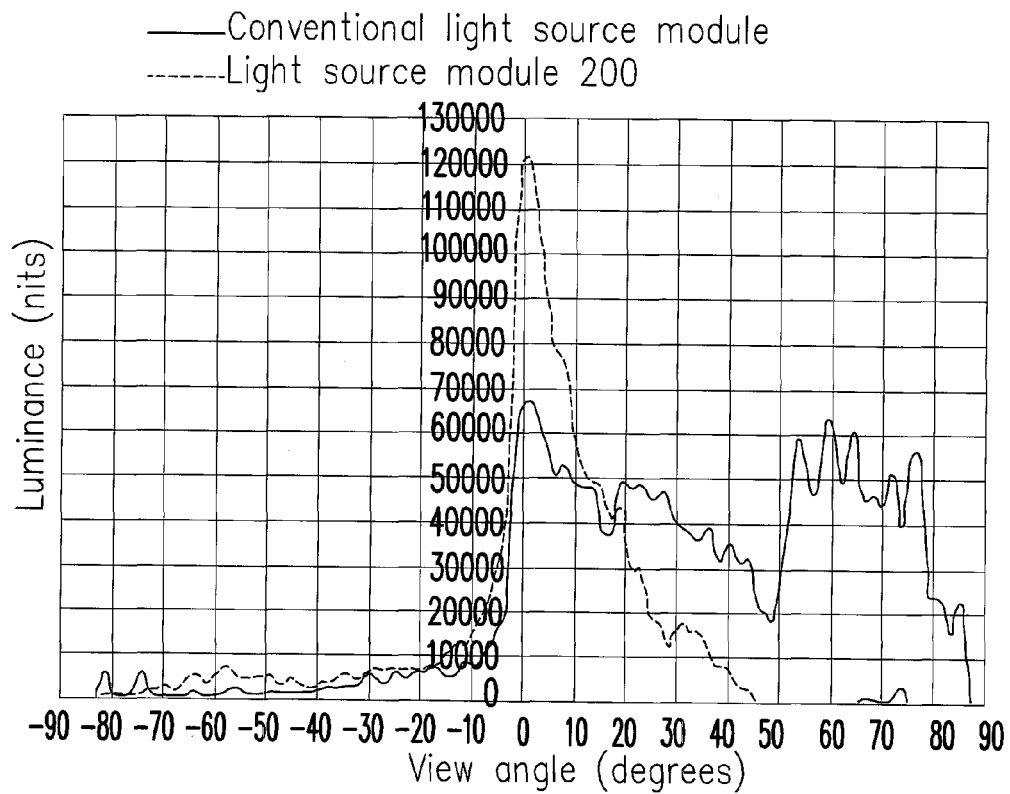
FIG. 21 illustrates the comparison between the luminance distribution of the light source module depicted in FIG. 1A and the luminance distribution of a conventional light source module.

FIG. 20 illustrates the comparison between the luminance distribution ratio of the light source module depicted in FIG. 1A and the luminance distribution ratio of the light source module depicted in FIG. 19. FIG. 21 illustrates the comparison between the luminance distribution of the light source module depicted in FIG. 1A and the luminance distribution of a conventional light source module. As shown in FIG. 20, due to the configuration of the LGP 100 of this embodiment, it could be observed from FIG. 20 that the difference between the luminance distribution ratio of the light source module 200D and the brightness distribution ratio of the light source module 200 is subtle no matter whether the reflective unit 220 is applied or not. Namely, the light source module 200 could in fact have favorable luminance in the normal direction without employing the reflective unit 220. In addition, as shown in FIG. 20, the light is mostly collected at the 0-degree view angle (i.e., in the z-axis direction). Further, in FIG. 21, the conventional light source module includes the reflective film and the LGP on which recessive micro-structures are configured. It can be observed from FIG. 21 that a great portion of the optical energy of the conventional light source module is in the direction having the non-zero-degree view angle. Therefore, the prism is required in the conventional light source module to guide the light at the non-zero-degree view angle toward the direction having the 0-degree view angle. By contrast, most optical energy of the light source module 200 in this embodiment is concentrated at the 0-degree view angle, and thus no prism sheet is required.

Figure 22A:
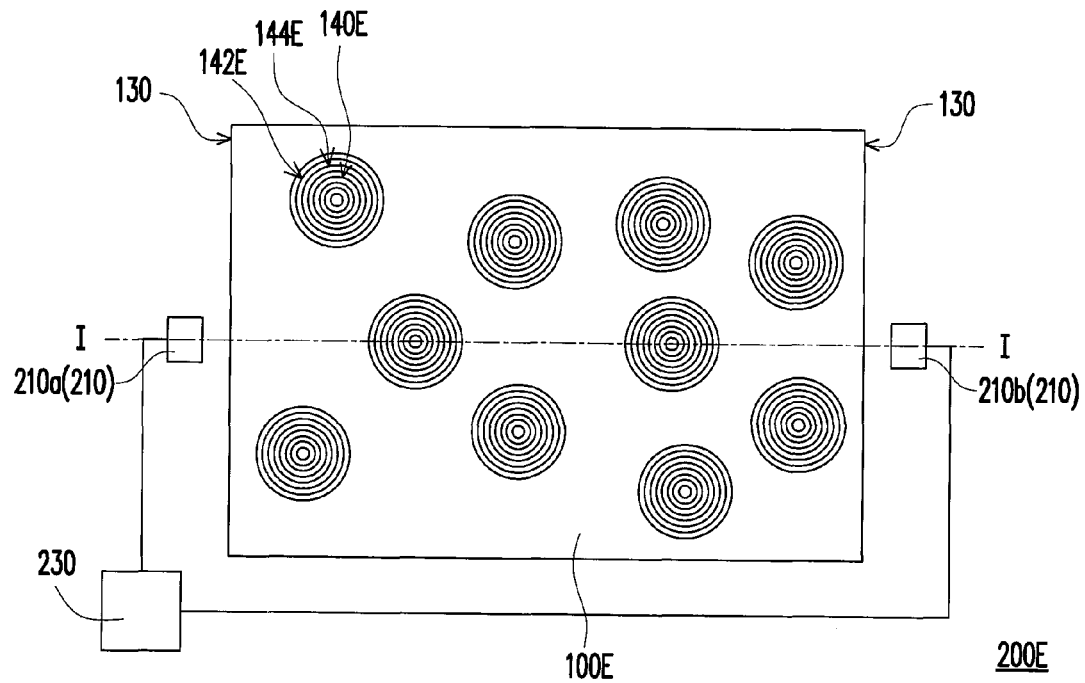
FIG. 22A is a schematic top view illustrating a light source module according to still another embodiment of the invention.
Figure 22B:
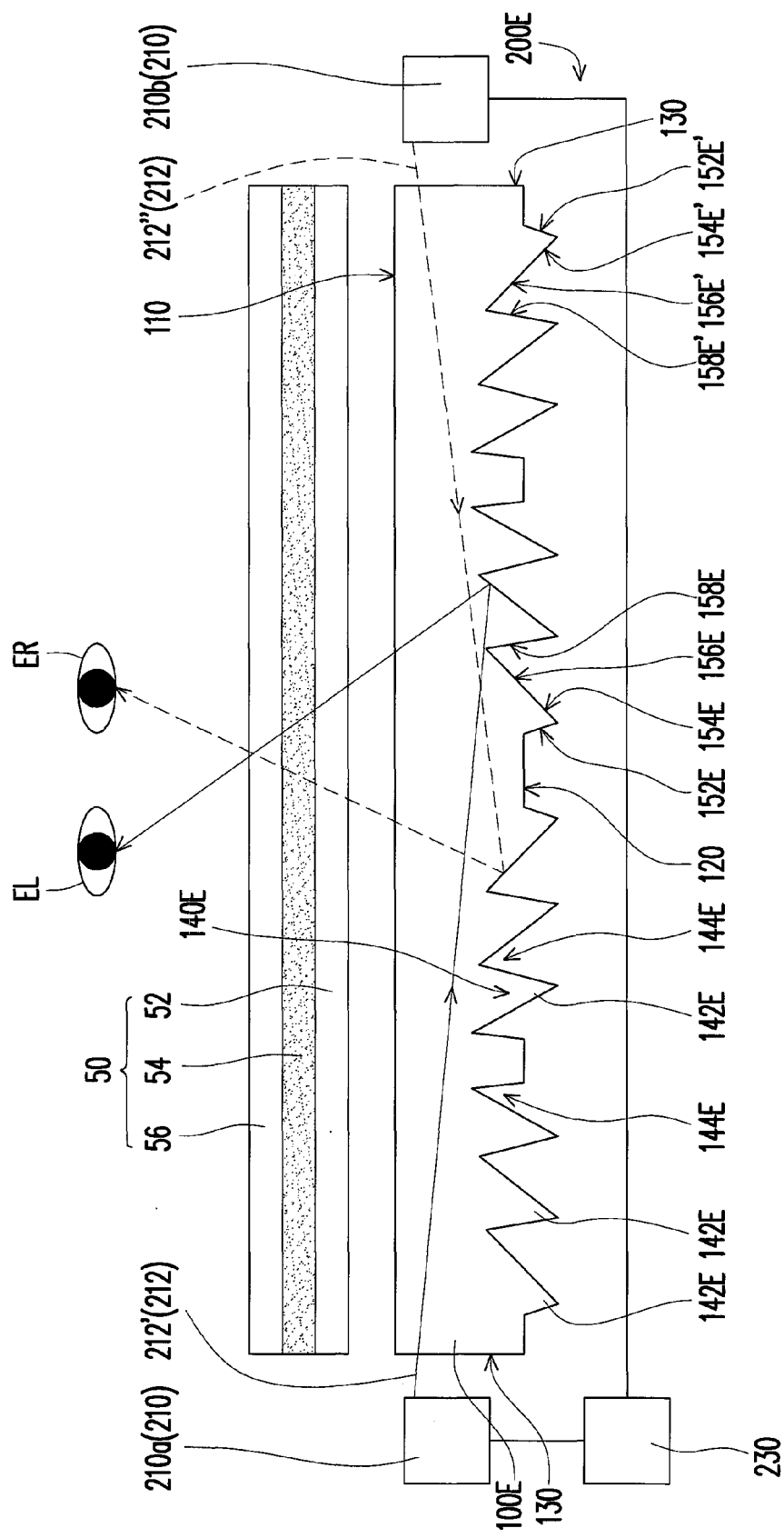
FIG. 22B is a schematic cross-sectional view illustrating the light source module depicted in FIG. 22A along a line I-I and illustrating an LCD panel disposed on the light source module.

FIG. 22A is a schematic top view illustrating a light source module according to still another embodiment of the invention. FIG. 22B is a schematic cross-sectional view illustrating the light source module depicted in FIG. 22A along a line I-I and illustrating an LCD panel disposed on the light source module. With reference to FIG. 22A and FIG. 22B, the light source module 200E of this embodiment is similar to the light source module 200 depicted in FIG. 1A, while the difference therebetween is described below. In this embodiment, the LGP 100E of the light source module 200E has two opposite light incident surfaces 130, and the light source module 200E has two light emitting devices 210 respectively disposed beside the two light incident surfaces 130. Each protrusive structure 142E of each of the micro-structure sets 140E further includes a fifth micro-surface 152E' and a sixth micro-surface 154E'. The fifth micro-surface 152E' and the first micro-surface 152E are connected to form a ring-shaped surface. The sixth micro-surface 154E' is connected to the fifth micro-surface 152E'. An inclined direction of the fifth micro-surface 152E' is different from (e.g., opposite to) an inclined direction of the sixth micro-surface 154E', and the sixth micro-surface 154E' and the second micro-surface 154E are connected to form a ring-shaped surface. Each recessive structure 144E of each of the micro-structure sets 140E further includes a seventh micro-surface 156E' and an eighth micro-surface 158E'. The seventh micro-surface 156E' and the third micro-surface 156E are connected to form a ring-shaped surface. The eighth micro-surface 158E' is connected to the seventh micro-surface 156E'. An inclined direction of the seventh micro-surface 156E' is different from (e.g., opposite to) an inclined direction of the eighth micro-surface 158E', and the eighth micro-surface 158E' and the fourth micro-surface 158E are connected to form a ring-shaped surface.

The light source module 200E of this embodiment further includes a control unit 230 that is electrically connected to the light emitting devices 210a and 210b, so as to drive the light emitting devices 210a and 210b to emit light alternately. That is to say, when the light emitting device 210a emits the light 212', the light emitting device 210b does not emit the light 212"; when the light emitting device 210b emits the light 212", the light emitting device 210a does not emit the light 212'.

Moreover, in this embodiment, an LCD panel 50 could be disposed above the light source module 200E, so as to form a three-dimensional display. The LCD panel 50 of this embodiment includes an active device array substrate 52, a liquid crystal layer 54, and an opposite substrate 56 that are sequentially arranged from bottom to top. Here, the active device array substrate 52 is a thin film transistor (TFT) array substrate, for instance, and the opposite substrate 56 is a color filter array substrate, for instance. Given the inclination degrees of the first micro-surface 152E to the eighth micro-surface 158E' are appropriately designed, the light 212' emitted by the light emitting device 210a could be guided toward the upper-left portion of FIG. 22B by the first micro-surface 152E to the fourth micro-surface 158E, and the light 212' carrying the images on the LCD panel 50 could then be transmitted to the left eye EL of a user; the light 212" emitted by the light emitting device 210b could be guided toward the upper-right portion of FIG. 22B by the fifth micro-surface 152E' to the eighth micro-surface 158E', and the light 212" carrying the images on the LCD panel 50 would then be transmitted to the right eye ER of the user. By the light 212' and the light 212" respectively and alternately carrying the left eye images and the right eye images, three-dimensional images can be formed in the brain of the user.

Figure 23:
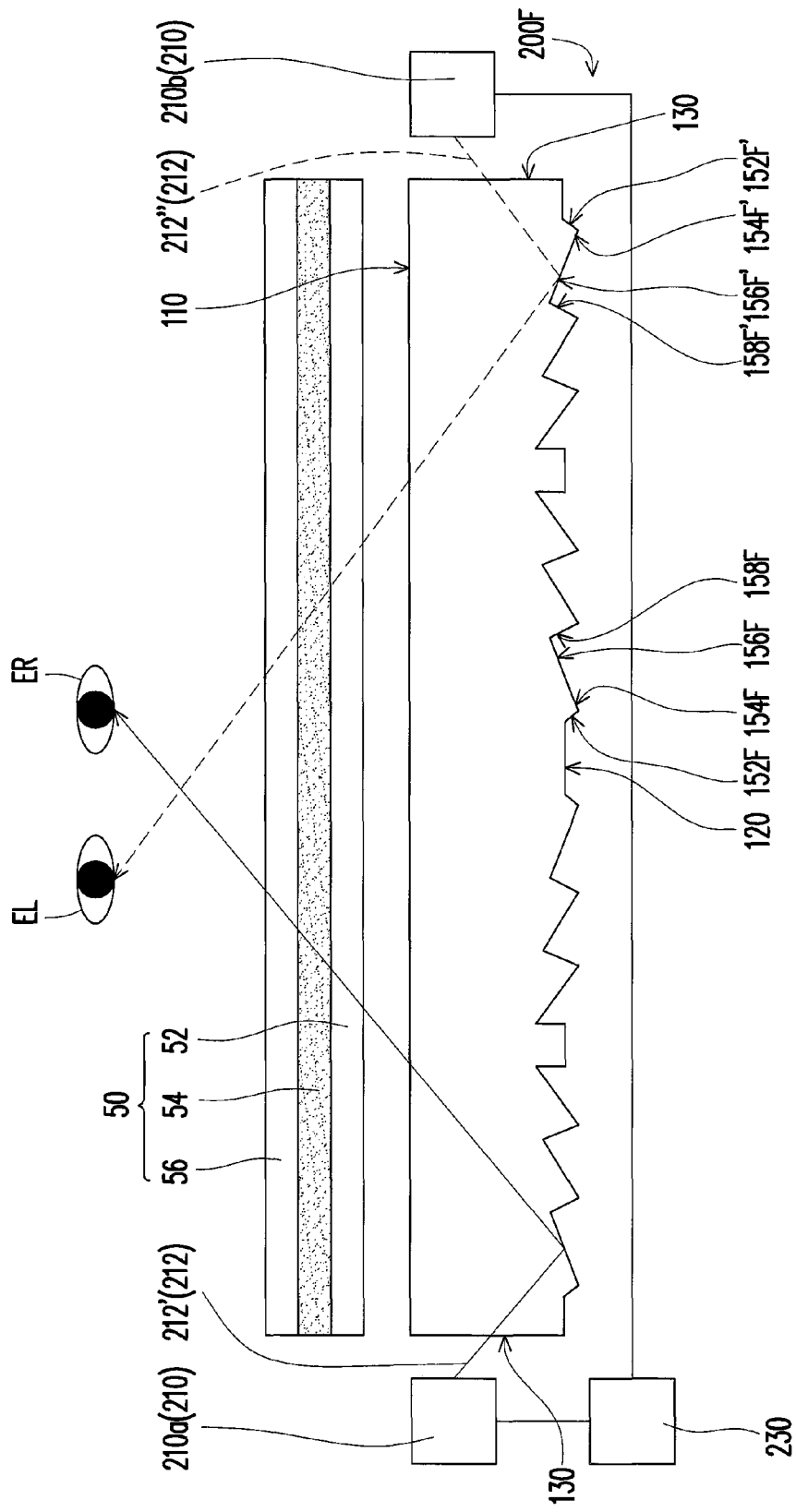
FIG. 23 is a schematic cross-sectional view illustrating the light source module and the LCD panel disposed on the light source module according to still another embodiment of the invention.

FIG. 23 is a schematic cross-sectional view illustrating the light source module and the LCD panel disposed on the light source module according to still another embodiment of the invention. With reference to FIG. 23, the light source module 200F of this embodiment is similar to the light source module 200E depicted in FIG. 22B, while the difference therebetween mainly lies in the inclination degrees of the first micro-surface 152F, second micro-surface 154F, third micro-surface 156F, fourth micro-surface 158F, fifth micro-surface 152F', sixth micro-surface 154F', seventh micro-surface 156F', and the eighth micro-surface 158F'. Specifically, in the light source module 200F of this embodiment, the inclination degrees of the first micro-surface 152F to the eighth micro-surface 158F' are respectively less than the inclination degrees of the first micro-surface 152E to the eighth micro-surface 158E' shown in FIG. 22B. Based on said design of the inclination degrees, the light 212' emitted by the light emitting device 210a could be guided toward the upper-right portion of FIG. 23 by the first micro-surface 152F to the fourth micro-surface 158F, and the light 212' carrying the images on the LCD panel 50 could then be transmitted to the right eye ER of the user; the light 212" emitted by the light emitting device 210b could be guided toward the upper-left portion of FIG. 23 by the fifth micro-surface 152F' to the eighth micro-surface 158F', and the light 212" carrying the images on the LCD panel 50 could then be transmitted to the left eye EL of the user. By the light 212" and the light 212' respectively and alternately carrying the left eye images and the right eye images, three-dimensional images can be formed in the brain of the user.

In light of the foregoing, the LGP and the light source module described in the embodiments of the invention include at least one of the following advantages.

The micro-structure sets having the protrusive structures and the recessive structures are applied in the LGP and the light source module according to the embodiments of the invention, and thereby the light could be effectively guided to be in the normal direction by the cooperation of the protrusive structures and the recessive structures. Besides, due to the individual design of the inclined angles θ1, θ2, and θ3 or the combined range design of the inclined angles θ1, θ2, and θ3, the light source module described in the embodiments of the invention could have favorable light emitting efficiency in the normal direction, and the emitted light could be collected more at the 0-degree view angle. Hence, the LGP described in the embodiments of the invention could guide light efficiently, and the light source module described in the embodiments of the invention has favorable brightness in the normal direction.

The foregoing description of the exemplary embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Apparently, many modifications and variations will be apparent to practitioners skilled in this art. The exemplary embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the disclosure is intended to be dedicated to the public regardless of whether the element or component is explicitly recited in the following claims.

What is claimed is:

1. A light source module comprising:
   a light guide plate comprising:
      a first surface;
      a second surface opposite to the first surface;
      two opposite light incident surfaces connecting the first surface to the second surface; and
      a plurality of micro-structure sets separately disposed on the second surface, wherein the micro-structure sets are not continuous in any direction parallel to the first surface, and each of the micro-structure sets comprises:
         at least one protrusive structure protruding from the second surface and the at least one protrusive structure comprising:
            a first micro-surface;
            a second micro-surface connecting the first micro-surface, an inclined direction of the first micro-surface being different from an inclined direction of the second micro-surface;
            a fifth micro-surface, the fifth micro-surface and the first micro-surface being connected to form a first ring-shaped surface; and
            a sixth micro-surface connected to the fifth micro-surface, an inclined direction of the fifth micro-surface being different from an inclined direction of the sixth micro-surface, the sixth micro-surface and the second micro-surface being connected to form a second ring-shaped surface; and
         at least one recessive structure recessed in the second surface and the at least one recessive structure comprising:
            a third micro-surface;
            a fourth micro-surface connecting the third micro-surface, an inclined direction of the third micro-surface being different from an inclined direction of the fourth micro-surface;

a seventh micro-surface, the seventh micro-surface and the third micro-surface being connected to form a third ring-shaped surface; and an eighth micro-surface connected to the seventh micro-surface, an inclined direction of the seventh micro-surface being different from an inclined direction of the eighth micro-surface, the eighth micro-surface and the fourth micro-surface being connected to form a fourth ring-shaped surface;

two light emitting devices disposed beside the two light incident surfaces respectively; and a control unit electrically connected to the light emitting devices, so as to drive the light emitting devices to emit light alternately.

2. The light source module as recited in claim 1, wherein the first micro-surface is located between the at least one light incident surface and the second micro-surface.

3. The light source module as recited in claim 2, wherein the third micro-surface is connected to the second micro-surface, and the second micro-surface and the third micro-surface are located between the first micro-surface and the fourth micro-surface.

4. The light source module as recited in claim 2, wherein the fourth micro-surface is connected to the first micro-surface, and the first micro-surface and the fourth micro-surface are located between the third micro-surface and the second micro-surface.

5. The light source module as recited in claim 1, wherein each of the micro-structure sets has a width in an arrangement direction of the at least one protrusive structure and the at least one recessive structure of the each of the micro-structure sets, the width of each of the micro-structure sets is greater than or equal to 6 μm and less than or equal to 2000 μm, each of the at least one protrusive structure and the at least one recessive structure has a width in the arrangement direction, and the width of the each of the at least one protrusive structure and the at least one recessive structure is greater than or equal to 3 μm and less than or equal to 1000 μm.

6. The light source module as recited in claim 1, wherein an inclined angle of a normal line at any point on the second micro-surface with respect to the second surface is greater than or equal to 30 degrees and less than or equal to 70 degrees.

7. The light source module as recited in claim 1, wherein an inclined angle of a normal line at any point on the third micro-surface with respect to the second surface is greater than or equal to 30 degrees and less than or equal to 70 degrees.

8. The light source module as recited in claim 1, wherein an inclined angle of a normal line at any point on the first micro-surface with respect to the second surface is greater than or equal to 0 degree and less than or equal to 85 degrees.

9. The light source module as recited in claim 1, wherein an inclined angle of a normal line at any point on the fourth micro-surface with respect to the second surface is greater than or equal to 0 degree and less than or equal to 20 degrees.

10. The light source module as recited in claim 1, wherein the number of the at least one protrusive structure and the at least one recessive structure in each of the micro-structure sets is greater than or equal to 3 in total, and the at least one protrusive structure and the at least one recessive structure in each of the micro-structure sets are alternately arranged on the second surface.

11. The light source module as recited in claim 1, wherein a connection portion between the at least one protrusive structure and the at least one recessive structure excludes any plane parallel to the second surface.

12. The light source module as recited in claim 1, wherein each cross-sectional line obtained by cutting the first micro-surface, the second micro-surface, the third micro-surface, and the fourth micro-surface along a direction perpendicular to the second surface is a straight line, a curve, or a bent line constituted by a plurality of straight lines having different slopes.

13. The light source module as recited in claim 1, wherein each of a connection portion between the first micro-surface and the second micro-surface and a connection portion between the third micro-surface and the fourth micro-surface has a chamfer, and the chamfer is a beveled edge, a protrusive round angle, or a recessive round angle.

14. The light source module as recited in claim 1, wherein the light guide plate further comprises:

a plurality of bar-shaped protrusions disposed on the first surface, each of the bar-shaped protrusions extending along a direction substantially perpendicular to the at least one light incident surface, the bar-shaped protrusions being arranged along a direction substantially parallel to the at least one light incident surface.

15. The light source module as recited in claim 1, wherein the light guide plate further comprises:

a plurality of bar-shaped protrusions disposed on the at least one light incident surface, each of the bar-shaped protrusions extending along a direction substantially perpendicular to the first surface, the bar-shaped protrusions being arranged along a direction substantially parallel to the first surface.

16. The light source module as recited in claim 1, further comprising a reflective unit disposed on the second surface.

* * * * *